Patented Feb. 13, 1951

2,541,139

UNITED STATES PATENT OFFICE 2,541,139

PROCESS FOR BLENDING ALKYD RESIN AND ETHER OF DIMETHYLOL UREA

Herbert J. West, Pittsburgh, Pa., assignor to American Cyanamid Company, New York, N. Y., a corporation of Maine No Drawing. Application July 18, 1947, Serial No. 761,992

14 Claims. (Cl. 260—21)

1

This application is a continuation-in-part of my copending application Serial No. 427,025, filed January 16, 1942, and now abandoned.

This invention relates to resinous compositions and to methods of preparing the same, and more particularly to the production of blends of alkyd resins with ethers of dimethylol urea and, specifically, with the dimethyl ether of dimethylol urea, which also may be named bis(methoxymethyl) urea. The invention is especially concerned with the production of compositions comprising a homogeneous blend, which is soluble in an aromatic hydrocarbon (e. g., benzene, toluene, xylene, etc.) of (1) an alkyd resin which is soluble in an aromatic hydrocarbon and (2) a partial condensation polymer of dimethyl ether of dimethylol urea, which polymer has been polymerized to a degree corresponding to the liberation of, by weight, not more than about 35%, more particularly from about 5 to about 30%, e. g., about 10%, of methanol (combined methanol) from the said ether, that is, from the total mass of ether which has been polymerized. Such compositions are prepared by dissolving in an alkyd resin of the kind aforementioned a substance of the class consisting of dimethyl ether of dimethylol urea (more particularly crystalline dimethyl ether of dimethylol urea) and partial condensation polymers thereof, which have been polymerized to the above-described degree, by heating a mixture of the said substance and the said resin until there has been formed a homogeneous blend which is soluble in an aromatic hydrocarbon. The dimethyl ether of dimethylol urea or the partial condensation polymer thereof as present in the said blend is polymerized to a degree corresponding to the liberation of not more than about 35% by weight of methanol from the said ether.

Many and varying processes have been suggested and used for blending alkyd resins with alkylated urea-formaldehyde resins. In general, it has been found that the compatibility of the alkylated urea-formaldehyde resins with the alkyd resins, especially those modified with oil acids, decreases with the molecular weight of the alcohol used for alkylation of the urea-formaldehyde resin. Thus the propylated urea-formaldehyde resins are less compatible with alkyd resins than the butylated resins and the ethylated resins have an even more limited range of compatibility. Therefore, it would be indicated that the methylated urea-formaldehyde resins are even less compatible with alkyd resins.

As set forth in my application Serial No.

2

404,203, filed July 26, 1941, now Patent No. 2,397,825, issued April 2, 1946, of which the aforementioned application Serial No. 427,025 is a continuation-in-part, I have found that the alkyl ethers of dimethylol urea, including the dimethyl ether of dimethylol urea, may be blended with alkyd resins to form valuable coating compositions. The blends are clear, stable compositions which are soluble in aromatic hydrocarbons and have other outstanding and unexpected properties. The results obtained are even more surprising since the ethers are substantially insoluble in aromatic hydrocarbons, but the blends of the ethers with the alkyd resins are soluble in aromatic hydrocarbons.

Various methods may be employed in carrying my invention into effect. For example, I may polymerize the dimethyl ether of dimethylol urea to a degree or extent corresponding to the liberation of not more than about 35%, more particularly from about 1 to about 35%, by weight of methanol (combined methanol) from the said ether, that is, I may prepare a condensation polymer of dimethyl ether of dimethylol urea which has been not more than about 35% demethylated (demethanolated), mix the resulting polymer with an alkyd resin which is soluble in an aromatic hydrocarbon and which may be either in molten or solution state, and heat the mixture thereby obtained, e. g., at from about 55° C. to about 100° C., preferably at from about 65° or 70° C. to about 90° or 95° C., until there has been formed a homogeneous blend which is soluble in an aromatic hydrocarbon. If desired, instead of pre-polymerizing the dimethyl ether of dimethylol urea before mixing it with the alkyd resin, I may mix the substantially unpolymerized dimethyl ether, e. g. substantially pure or crystalline dimethyl ether of dimethylol urea, with the alkyd resin in molten or solution state, and heat the resulting mixture as above described. The dimethyl ether is polymerized during this heating to a degree corresponding to the liberation of not more than about 35% by weight of methanol therefrom. I prefer to pre-polymerize the dimethyl ether prior to mixing it with the alkyd resin, since a shorter heating period is required and less difficulty is encountered in obtaining a homogeneous blend than when the unpolymerized ether is mixed with the resin.

As indicated hereinbefore, the polymerized or unpolymerized dimethyl ether of dimethylol urea may be mixed either with the molten alkyd resin or with a solution thereof (e. g., a solution of the resin in an aromatic hydrocarbon), after which the mixture is heated as above described. Heating is continued until the added polymer or the polymer which is formed in situ dissolves in the resin or resin solution, and a homogeneous blend, a sample of which remains clear on cooling, is obtained. The blend is soluble in aromatic hydrocarbons, examples of which have been given hereinbefore.

In order that those skilled in the art better may understand how the present invention may be carried into effect, the following examples are given by way of illustration and not by way of limitation. All parts and percentages are by weight.

EXAMPLE 1

*Ether A*

This ether is preferably prepared in accordance with the following procedure described in my aforementioned application Serial No. 404,203:

To 100 parts of crystalline dimethylol urea from any suitable source is added 200 parts of methyl alcohol. One-third part of oxalic acid crystals is added and the mixture is stirred at a temperature below 30° C. until a clear solution having a pH of 2.8 is obtained, indicating that reaction is complete. To the reaction mass is added sufficient barium hydroxide to precipitate barium oxalate and thereby remove the oxalic acid from the solution. A slight excess of barium hydroxide is used to give a pH of 7.5–8.0. The precipitated barium oxalate is removed by filtration and the filtrate is concentrated in vacuo (26–28 inches) by heating to a temperature not exceeding 50° C. The concentration is continued until the solution contains about 60% solids, at which point the greater part of the excess methyl alcohol and water will have been removed.

The ether solution is further concentrated in vacuo as above, the heating and concentration being continued until a temperature of about 90° C. is reached. At this time the last traces of water are removed by adding toluene in an amount equal to about 20% of the calculated yield, and distillation is continued in vacuo at about 80° C. until the toluene and water are removed. The resultant product is a clear melt which may then be dumped in trays or the like and allowed to harden. The nitrogen content of this resinous or semi-crystalline product indicates that it has been polymerized to a degree corresponding to the liberation of about 11% of methanol from the ether.

*Alkyd resin B*

This is an alkyd resin prepared from phthalic anhydride and glycerol and modified with about 55% of the fatty acids of soya bean oil. It is soluble in aromatic hydrocarbons. The methods of preparation of this and the other alkyd resins utilized herein are well-known in the prior art and need not be set forth in detail.

| | Parts |
|---|---|
| Ether A | 25 |
| Alkyd resin B | 75 |

The alkyd resin is premelted and heated to about 70° C. and the ether is added with stirring, the temperature being maintained until the mixture is homogeneous as indicated by the fact that a pill removed from the batch will remain clear on cooling. At this time, the blend may be poured into suitable trays and allowed to cool, whereupon a solid resin is formed which may be stored and shipped. For use, as in a coating composition, the resin need merely be remelted and dissolved, while hot, in a suitable solvent to the desired solids content. Alternatively, the hot blend prepared as described above may be cut directly, while hot, with a solvent such as xylene or toluene to the desired solids content and the solution thus prepared may be stored and shipped as expedient.

EXAMPLE 2

*Ether C*

This ether is prepared following the procedure set forth under Example 1 with the reference to Ether A down through the period of heating at a temperature not exceeding 50° C. At this point, instead of raising the temperature, there is added to the concentrated solution an equal part of toluene and the distillation is continued to remove any remaining water and uncombined methyl alcohol. The methanol and water-free mixture is obtained as a slurry since the ether crystals are insoluble in toluene. The slurry is filtered and the crystals dried to remove any adhering toluene. Throughout these operations the temperature of the materials is maintained below 50° C. The mass of crystals obtained represents a yield corresponding to 100% theoretical. These crystals have a melting point of 90°–95° C. and, based on an analysis of their nitrogen content, are about 102% pure, the excess above theory being due to slight demethylation.

| | Parts |
|---|---|
| Ether C | 30 |
| Alkyd resin B (see Example 1) | 70 |

The above ingredients are mixed and blended as in Example 1 with the exception that the heating is carried out at temperatures of about 80° C. for a slightly longer period of time, thereby effecting further demethylation (condensation polymerization) of the ether and yielding a homogeneous blend which is soluble in aromatic hydrocarbons, e. g., toluene, xylene, etc. During heating the ether is polymerized to a degree corresponding to the liberation of not more than about 35% of methanol therefrom.

EXAMPLE 3

| | Parts |
|---|---|
| Ether C | 48.8 |
| Xylene solution of alkyd resin B (see Example 1), which solution is composed of 195 parts of solid resin dissolved in 105 parts xylene | 300.0 |

The alkyd resin solution was heated to about 80° C., and the ether was added with stirring while maintaining the temperature at that point. After heating for about 15 minutes at 80° C., the temperature was gradually raised to about 90° C. and was held at that point for an additional period of about 15 minutes. The solution was then cooled, yielding a clear, homogeneous blend containing 70% of solids dissolved in xylene.

EXAMPLE 4

*Alkyd resin D*

This is a typical glyceryl phthalate resin modified with dehydrated castor oil in an amount equivalent to about 45% of the corresponding oil fatty acids.

| | Parts |
|---|---|
| Ether A | 20 |
| Xylene solution of alkyd resin D (80 parts of solid resin dissolved in 80 parts of xylene) | 160 |

The alkyd resin was heated to 80° C. as in Example 3, the ether added and the solution then heated at this temperature until the solution on cooling remained perfectly clear. This required from 20 to 40 minutes. The solution was allowed to cool, after which 20 parts of butanol was added. The solution then contained 47% of solids.

EXAMPLE 5

Two different alkyd resins were used, one (resin E) of which was prepared by reaction in known manner of 145 parts phthalic anhydride, 3 parts fumaric acid, 100 parts glycerol, 125 parts of soya bean oil and 155 parts of soya bean oil fatty acids, and the other (resin F) by reaction of 148 parts of phthalic anhydride, 150 parts of castor oil and 92 parts of glycerol.

Blends were prepared from each of the above resins dissolved in xylene and crystalline dimethyl ether of dimethylol urea or partial condensation polymers thereof which had been polymerized to a degree corresponding to the liberation of not more than about 35% of methanol therefrom, that is, not more than about 35% demethylated. The crystalline dimethyl ether was substantially pure; nitrogen analyses indicated a purity of the order of 99-99.5%.

The condensation polymerization or partial demethylation of the crystalline dimethyl ether of dimethylol urea was carried out by two different procedures. In the one procedure a portion of the pure ether was slurried in approximately eight times its weight of toluene and heated under reflux for varying lengths of time. The drop in the temperature of the reaction mass was taken as a relative measure of demethylation that occurred during a given period of time. The water and free methanol were then removed by distillation at atmospheric pressure while adding dry toluene thereto, the distillation being discontinued when the temperature of the mass reached 111° C. The slurry was chilled to 20° C. and the condensation polymer or demethylated ether was filtered off by means of suction and recrystallized from hot acetone. The extent of polymerization or demethylation was calculated from the nitrogen content of the polymerized material and, also, from the results of analyses for methanol in the distillate.

In another procedure phthalic acid in an amount sufficient to catalyze the condensation polymerization (in all but one case 0.1% of the ether being polymerized) and the pure crystalline ether were added to a three-necked reaction vessel fitted with a stirrer, thermometer and condenser. "Dry-ice" (solid carbon dioxide) traps were so located that any uncondensed vapor passing through the condenser would not be lost. The mixture was heated under 15 to 17 inches of vacuum until approximately 80% of the calculated methanol had been distilled off, at which time heating was discontinued and the vacuum was increased to 27 to 28 inches and maintained at this point until no more distillate was obtained. The partial condensation polymer was poured immediately into a flat-bottomed tray and air dried. The degree of polymerization or demethylation was calculated from determinations of nitrogen and methanol as in the first procedure.

The partial condensation polymers or demethylated ethers prepared as above described (seven different samples) were polymerized to a degree corresponding to the liberation of from about 5 to about 35% of methanol from the ether.

The pure, crystalline ether and the aforementioned partial condensation polymers were then blended with xylene solutions of resins E and F, using 20% of ether and an amount of resin solution corresponding to 80% of solid resin. In preparing the blend the resin solution in most cases was first heated on a steam bath to 80° C. The crystalline ether or partial condensation polymer thereof was then added, and heating with agitation was continued for from about 9 to 75 minutes, that is, until a sample pill placed on a glass plate remained clear for from 40 to 60 minutes. In the case of the more highly condensed polymers, e. g., a polymer which had been condensed to a degree corresponding to the liberation of about 35% of methanol from the ether, the polymer was added to the unheated alkyd resin solution and the mixture then was heated as above described. Longer heating periods were required to obtain homogeneity in the case of the pure ether than with the partial condensation polymers thereof.

The resulting products were homogeneous blends of the alkyd resin and a partial condensation polymer of the dimethyl ether of dimethylol urea which had been polymerized either initially or while heating during blending to a degree corresponding to the liberation of not more than about 35% of methanol from the ether. The blends were soluble in the xylene solvent and showed no separation of resin or polymer when additional xylene was added to replace that lost during processing or, in the case of resin F, when an additional 20% of n-butanol was added thereto. The xylene solutions of the blends containing resin E varied in resin solids content from about 65.5 to 68%, while the xylene-butanol solutions of the blends containing resin F varied in solids content from about 46.5 to 48.5%.

When the pure dimethyl ether of dimethylol urea was pre-polymerized to a degree corresponding to the liberation of substantially more than 35%, e. g., about 37 to 40%, of methanol from the ether and effort was made to blend the polymer with an alkyd resin of the kind and in the manner above described, the polymer was incompatible with the resin and it was not possible to obtain a homogeneous blend.

As has been described above and especially in the examples, the practicing of my invention involves the utilization of a partial condensation polymer of the dimethyl ether of dimethylol urea, which also may be designated as a partially demethylated ether (or a partially demethylated methyl ether) of dimethylol urea. The term "demethylated" is to be understood as describing the polymerization or condensation reaction with accompanying loss of methyl alcohol resulting from the heating of the ether to form resinous products. By partially demethylated ethers or methyl ethers of dimethylol urea, products are meant which are partially polymerized but which are not sufficiently demethylated to produce insoluble resins. This demethylation is not to be confused with the well-known procedure of replacing the methoxy groups in the methyl ethers with higher alkoxy groups such as butoxy.

Alkyd resins other than those hereinbefore described similarly may be blended with the dimethyl ether of dimethylol urea or with partial condensation polymers thereof which have been polymerized or demethylated to the degree herein set forth to yield valuable products. As is well known, these alkyds may be prepared from polyhydric alcohols other than glycerol, e. g., glycols, glycol ethers, pentaerythritol, dipentaerythritol, etc., or from mixtures of two or more polyhydric alcohols. Various polycarboxylic acids, e. g., malonic, succinic, glutaric, adipic, pimelic, suberic, sebacic, citric, tricarballylic, benzoylphthalic, diphenic, terephthalic, etc., or anhydrides thereof, if available, may be used in place of all or a part of phthalic anhydride in resin formulations of the kind mentioned above by way of illustration. If desired, phthalic acid may be used in place of phthalic anhydride. The resins may be modified by the inclusion of various monocarboxylic acids, e. g., saturated and unsaturated fatty acids, the natural resin acids, tall oil and the like. Likewise monohydric alcohols, e. g., benzyl alcohol, cyclohexyl alcohol, etc., and other modifiers may be introduced into the alkyd resin molecule. Other and more specific examples of primary and secondary (modifying) reactants that may be employed are given in the copending application of Harry F. Pfann and Edward L. Kropa, Serial No. 738,736, filed April 1, 1947. The alkyd resins used in carrying the present invention into effect are of the type which are soluble in the usual organic solvents and especially aromatic hydrocarbons.

The hereindescribed blends form clear, stable solutions in aromatic hydrocarbons and these solutions give crystal clear films when they are flowed out on a suitable surface and are allowed to dry. Exceedingly flexible films are obtained with blends of about 20 to 30% of the pure ether or partial condensation polymers thereof with about 80 to 70% of an alkyd resin which is soluble in an aromatic hydrocarbon, e. g., an alkyd resin modified with a non-oxidizing fatty acid, as for instance, one prepared from glycerol, phthalic anhydride and castor oil in amounts equivalent to 50% phthalic glyceride (glyceryl phthalate) and 50% castor oil. The ethers which have been partially polymerized as described above are extremely compatible with long oil alkyd resins (resins containing 85% or more of modifying fatty acids) as contrasted with the commonly used alkylated urea resins which ordinarily are not compatible with these long oil resins.

The blends prepared in accordance with the present invention are also characterized by the property of curing rapidly at low baking temperatures. Consequently these blends are especially satisfactory for use in industrial finishing enamels, the enamel coatings obtained being harder than is the case with previously used materials of this nature. Thus, an enamel prepared from titanium dioxide and the resin-ether solution of Example 3 in a pigment-to-resin ratio of 1 to 1 was thinned with a solvent and sprayed on bare steel panels, some of the coatings being baked at 250° F. and others at 300° F. for varying periods of time. Sward hardness tests indicated that these enamel coatings were over two times as hard as similar enamel coatings made from an alkyd resin modified with a commercial butylated urea-formaldehyde resin in place of the partial condensation polymers or demethylated ethers used in practicing the present invention.

The conditions for preparing the blends may be varied somewhat from those set forth above, although it is generally desired that the time and temperature of heating should be no greater than necessary. Heating, if continued too long, may cause premature gelation with formation of insoluble products. As indicated hereinbefore, the demethylated ether (partial condensation polymer) is required, whether prepared separately or formed during the heating with the alkyd resin. Satisfactory blends are obtained with no heating other than that required to dissolve the demethylated ether in the alkyd resin. The blends are best hardened by heating, and in some cases it may be desirable to hasten the cure by using a small amount of a suitable acid or acid-forming catalyst.

I claim:

1. The process which comprises mixing together (1) a solution of a soluble alkyd resin dissolved in a solvent comprising an aromatic hydrocarbon and (2) a substance of the class of dimethyl ether of dimethylol urea and partial condensation polymers thereof which have been polymerized to a degree corresponding to the liberation of not more than about 35% by weight of methanol from the said ether, and heating the resulting mixture until there has been formed a blend which remains clear on cooling, the said substance as present in the said blend having been polymerized to a degree corresponding to the liberation of not more than about 35% by weight of methanol from the said ether.

2. The process which comprises mixing together (1) a solution of a soluble alkyd resin dissolved in a solvent comprising an aromatic hydrocarbon and (2) a dimethyl ether of dimethylol urea, and heating the resulting mixture until there has been formed a blend which remains clear on cooling, the said dimethyl ether of dimethylol urea as present in the said blend having been polymerized to a degree corresponding to the liberation of not more than about 35% by weight of methanol from the said ether.

3. The process which comprises mixing together (1) a solution of a soluble alkyd resin dissolved in an aromatic hydrocarbon and (2) a partial condensation polymer of dimethyl ether of dimethylol urea, the said polymer having been polymerized to a degree corresponding to the liberation of not more than about 35% by weight of methanol from the said ether, and heating the resulting mixture until there has been formed a blend which remains clear on cooling.

4. The process which comprises polymerizing dimethyl ether of dimethylol urea to a degree corresponding to the liberation of not more than about 35% by weight of methanol from the said ether, adding the resulting polymer to a solution of a soluble alkyd resin dissolved in an aromatic hydrocarbon, and heating the resulting mixture until there has been formed a blend which remains clear on cooling.

5. The process which comprises heating a mixture containing (1) a solution of a soluble alkyd resin dissolved in a solvent comprising an aromatic hydrocarbon and (2) a substance of the class consisting of dimethyl ether of dimethylol urea and partial condensation polymers thereof which have been polymerized to a degree corresponding to the liberation of from about 5% to about 30% by weight of methanol from the said ether, and continuing the heating until there has been formed a homogeneous blend which is soluble in an aromatic hydrocarbon, the said substance as present in the said blend having been polymerized to a degree corresponding to the liberation of from about 5% to about 30% by weight of methanol from said ether.

6. A process as in claim 5 wherein the partial condensation polymer of dimethyl ether of dimethylol urea has been polymerized to a degree corresponding to the liberation of about 10% of methanol from the said ether.

7. A process as in claim 5 wherein the alkyd resin of (1) constitutes, by weight, from 70 to 80% and the polymer of (2) from 30 to 20% of the said mixture.

8. The process which comprises mixing together (1) a xylene solution of a soya bean oil fatty acid-modified alkyd resin and (2) a partial condensation polymer of dimethyl ether of dimethylol urea, the said polymer having been polymerized to a degree corresponding to the liberation of from 5 to 35% by weight of methanol from the said ether, and heating the resulting mixture with agitation until a sample pill placed on a glass plate remains clear for from 40 to 60 minutes.

9. A process as in claim 3 wherein the aromatic hydrocarbon comprises benzene.

10. A process as in claim 3 wherein the aromatic hydrocarbon comprises toluene.

11. A process as in claim 3 wherein the aromatic hydrocarbon comprises xylene.

12. A process as in claim 3 wherein the soluble alkyd resin is a soluble castor oil fatty acid-modified alkyd resin.

13. A process as in claim 3 wherein the soluble alkyd resin is a soluble soya bean oil fatty acid-modified alkyd resin.

14. A process as in claim 3 wherein the partial condensation polymer of the dimethyl ether of dimethylol urea has been polymerized to a degree corresponding to the liberation of from about 5 to about 30% by weight of methanol from the said ether.

HERBERT J. WEST.

REFERENCES CITED

The following references are of record in the file of this patent:

UNITED STATES PATENTS

| Number | Name | Date |
|---|---|---|
| 1,699,245 | Luther | Jan. 15, 1929 |
| 1,877,130 | Hill et al. | Sept. 13, 1932 |
| 2,043,159 | Eisenmann et al. | June 2, 1936 |
| 2,074,814 | Smith | May 23, 1937 |
| 2,101,534 | Edgar | Dec. 7, 1937 |
| 2,213,921 | Sorenson | Sept. 3, 1940 |
| 2,254,001 | Conaway | Aug. 26, 1941 |

FOREIGN PATENTS

| Number | Country | Date |
|---|---|---|
| 320,915 | Great Britain | Oct. 28, 1929 |
| 857,931 | France | Apr. 29, 1940 |

OTHER REFERENCES

Barron, "Modern Plastics," pages 201 and 202, pub. 1945 by John Wiley and Sons, N. Y.

Ellis, "The Chemistry of Synthetic Resins," pub. 1935, pages 867–869, Reinhold Pub. Corp., N. Y.

Certificate of Correction

Patent No. 2,541,139 February 13, 1951

HERBERT J. WEST

It is hereby certified that error appears in the printed specification of the above numbered patent requiring correction as follows:

Column 7, line 7, for "anhydides" read *anhydrides*; column 8, line 15, after "class" insert *consisting*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*